United States Patent [19]

Miller

[11] Patent Number: 6,068,329
[45] Date of Patent: May 30, 2000

[54] REAR-IMPACT UNDERRIDE PROTECTOR

[75] Inventor: Terrance L. Miller, Faribault, Minn.

[73] Assignee: Wenger Corporation, Owatonna, Minn.

[21] Appl. No.: 09/167,689

[22] Filed: Oct. 7, 1998

[51] Int. Cl.[7] .................................................. B60J 7/00
[52] U.S. Cl. .......................... 296/189; 296/188; 188/377; 293/118
[58] Field of Search ................................... 296/188, 189; 188/377; 293/133, 132, 118, 119

[56] References Cited

U.S. PATENT DOCUMENTS

| | | | |
|---|---|---|---|
| 3,412,628 | 11/1968 | Gain | 293/133 |
| 3,437,367 | 4/1969 | Blank | 293/133 |
| 3,495,474 | 2/1970 | Nishimura et al. | 293/133 |
| 3,887,223 | 6/1975 | Bez | 293/133 |
| 3,981,114 | 9/1976 | Chupick | 293/133 |
| 4,023,652 | 5/1977 | Torke | 293/133 |
| 4,465,312 | 8/1984 | Werner | 293/133 |
| 4,641,871 | 2/1987 | Vaughn | 293/118 |
| 4,930,823 | 6/1990 | Rivera | 293/133 |
| 5,022,703 | 6/1991 | Westbrook | 293/118 |
| 5,174,421 | 12/1992 | Rink et al. | 293/133 |
| 5,201,912 | 4/1993 | Terada et al. | 293/132 |
| 5,273,330 | 12/1993 | Petry et al. | 293/133 |
| 5,403,049 | 4/1995 | Ebbinghaus | 293/133 |
| 5,520,428 | 5/1996 | Bell | 293/118 |
| 5,624,143 | 4/1997 | Waldschmitt | 293/118 |
| 5,673,953 | 10/1997 | Spease | 293/118 |
| 5,803,514 | 9/1998 | Shibuya et al. | 293/133 |
| 5,941,582 | 8/1999 | Tan | 293/132 |

*Primary Examiner*—Joseph D. Pape
*Assistant Examiner*—Kiran Patel
*Attorney, Agent, or Firm*—Patterson & Keough, P.A.

[57] ABSTRACT

A mountable underride protector for absorbing energy generated by a collision between vehicles, through deformation, includes a crushable link, a horizontal barrier member depending therefrom, or both. The horizontal barrier member and crushable link are positioned beneath and depending from the underdeck of a trailer or semi-trailer. Placement of the device beneath the underdeck is dependent upon and will vary with the particular design of the trailer or semi-trailer and may be accomplished through the use of both permanent and detachable mounting techniques.

19 Claims, 4 Drawing Sheets

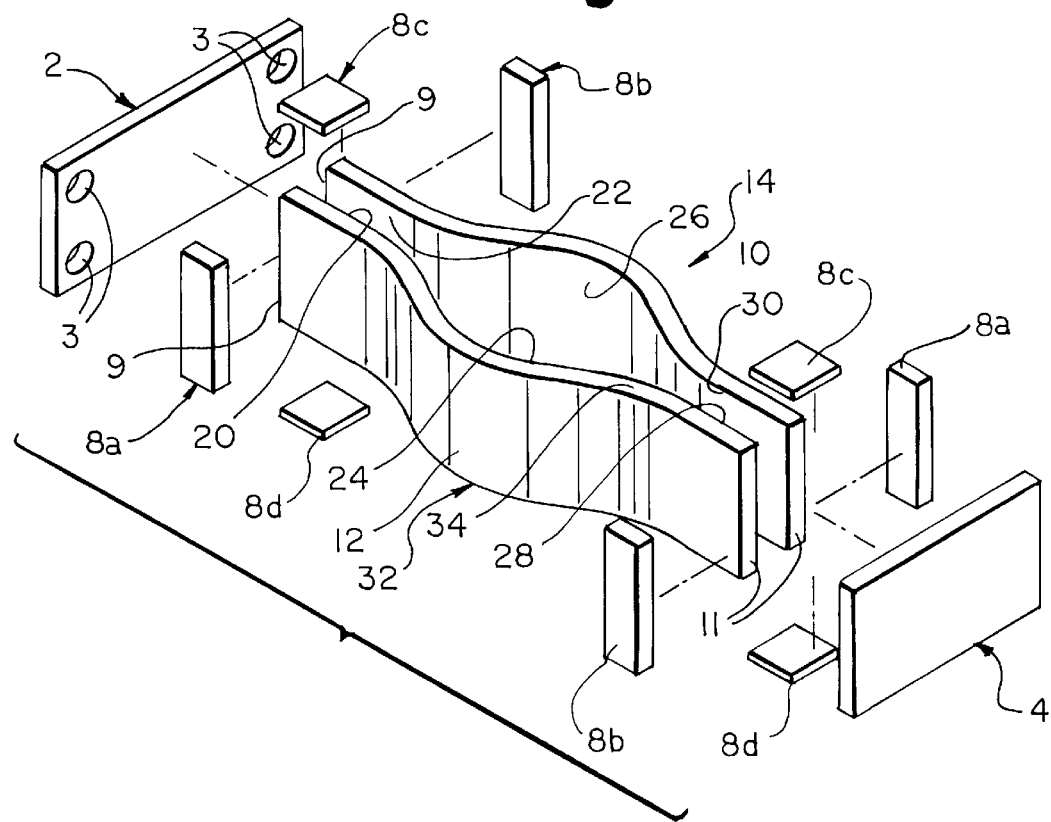
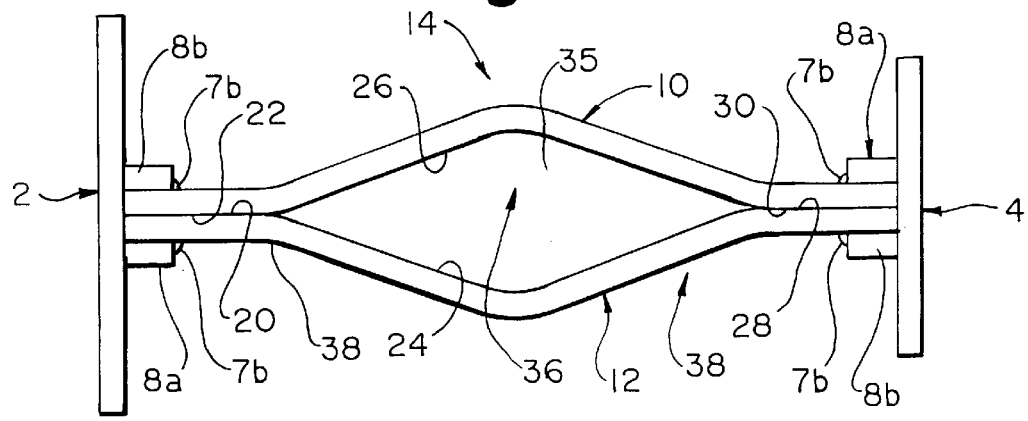

REAR-IMPACT UNDERRIDE PROTECTOR

BACKGROUND OF THE INVENTION

Our roadways and thoroughfares are occupied by many vehicles, including cars, light-duty vehicles, trailers, and semi-trailers. As will sometimes happen, whether as a result of congestion, poor driving conditions, driver error, or for other reasons, rear-impact collisions occur. Rear-impact collisions are especially troublesome when they involve a car or light-duty vehicle and a trailer or semi-trailer. This is true due to the propensity of such vehicles to advance, subsequent to impact, substantially beyond the bumper and into an area beneath the undercarriage of the trailer, causing tremendous property damage, injury, and oftentimes even death.

As a result, U.S. Department of Transportation regulations mandate the installation of rear-impact guards on trailers and semi-trailers with a gross vehicle weight greater than or equal to 4,536 kg (approx. 10,000 lbs.). In the United States, such rear-impact guards must extend horizontally to within 100 mm (approx. 4 in.) of either side extremity of the vehicle. The bottom edge of the horizontal member of the impact guard must be, at all points, within 560 mm (approx. 22 in.) to ground level. Finally, at any height equal to or greater than 560 mm (approx. 22 in.) above ground level, the rearmost surface of the impact guard must be no more than 305 mm (12 in.) forward from the vehicle's rearmost portion. Preferably, the rearmost surface of the impact guard is positioned coplanar with or extending rearward from the transverse vertical plane which defines the rearmost extremity of the vehicle.

Rear-impact guards in the past have consisted of a rigidly-affixed horizontal member suspended from one or more struts attached to the undercarriage of the trailer. Often, these struts include one vertical member and one inclined member coupled to the undercarriage and horizontal member in a triangular formation. The vertical and inclined members must be of sufficient length and rigidity such that when the rear guard sustains an impact, the members are able to bend and deform while absorbing the energy. Such absorption of energy by the vertical and inclined members includes both horizontal and vertical components. Disadvantages with previous designs include their difficulty of removal, lack of deformation or "give," and poor suitability for low-profile vehicles.

Trailers that have a profile lower than a standard trailer, but still above 560 mm (approx. 22 in.) are often unable to utilize the aforementioned design because there is insufficient clearance for inclusion of inclined and vertical members possessing the proper attributes to absorb energy through deformation. If the members are too short, they do not provide sufficient energy absorption to prevent a vehicle from encroaching upon the undercarriage of the trailer. Alternatively, if the strength characteristics of the members are increased, the impact guard becomes too rigid and fails to deform while absorbing energy from the impact. As such, there is a need in the industry for an alternatively-designed rear-impact guard that possess appropriate absorption means for low-profile trailers, semi-trailers, and other vehicles.

SUMMARY OF THE INVENTION

Accordingly, it is a general object of this invention to provide an alternative design for a rear-impact underride protector which may be mounted onto both standard and low-profile trailers and semi-trailers to bear impact forces in a manner that provides the greatest protection to an impacting vehicle and to the occupants of the vehicle.

It is another object of this invention to provide a rear-impact underride protector which absorbs the energy from a rear-impact collision substantially by way of horizontal energy absorption means with little or no vertical energy absorption means.

It is another object of this invention to provide a rear-impact underride protector that may be detached from and reattached to the undercarriage of the trailer, semi-trailer, or other vehicle.

These and other objects of this invention are achieved by providing a rear-impact underride protector for horizontal absorption of the energy generated in a rear-impact collision. The overall frame comprises barrier means and absorption means which may be secured to the trailer, semi-trailer, or other vehicle by a variety of methods.

The rear-impact underride protector of the present invention includes an impact barrier guard coupled to a crushable absorption link. The underride protector is designed for placement beneath the undercarriage of a vehicle to enable the effective absorption of energy generated in rear-impact collisions, through horizontal deformation. The mounting devices are arranged for attachment of the rear-impact underride protector at a suitably rigid and secure location beneath the vehicle undercarriage.

The present invention is further comprised of one or more compressible links coupled to a horizontal barrier member. Together, the link and member frame operate to absorb energy from collisions through deformation. In one embodiment of the invention, the frame is detachably connected to the undercarriage of a trailer or semi-trailer. Other types of connection are contemplated according to various embodiments of the invention.

BRIEF DESCRIPTION OF THE DRAWINGS

Other objects and many of the attendant advantages of this invention will be appreciated as it becomes better understood by reference to the following detailed description when considered in connection with the accompanying drawings, wherein:

FIG. 1 is a perspective, exploded view of a representative crushable absorption link;

FIG. 2 is a top plan view of one of the representative crushable absorption links;

DETAILED DESCRIPTION OF THE PREFERRED EMBODIMENT

Referring now in greater detail to the various figures of the drawings, there is shown a rear-impact underride protector 18 of the present invention for attachment to a trailer, semi-trailer, or vehicle to prevent a light-duty vehicle or other automobile from encroaching substantially beyond the bumper to the undercarriage of a trailer, semi-trailer, or other vehicle in a rear-impact collision. The rear-impact underride protector 18 is comprised of an impact barrier guard 16 coupled to a crushable absorption link 14, which may be further coupled to the undercarriage 40 of a trailer, semi-trailer, or other vehicle using a variety of mounting techniques.

Figure 3:
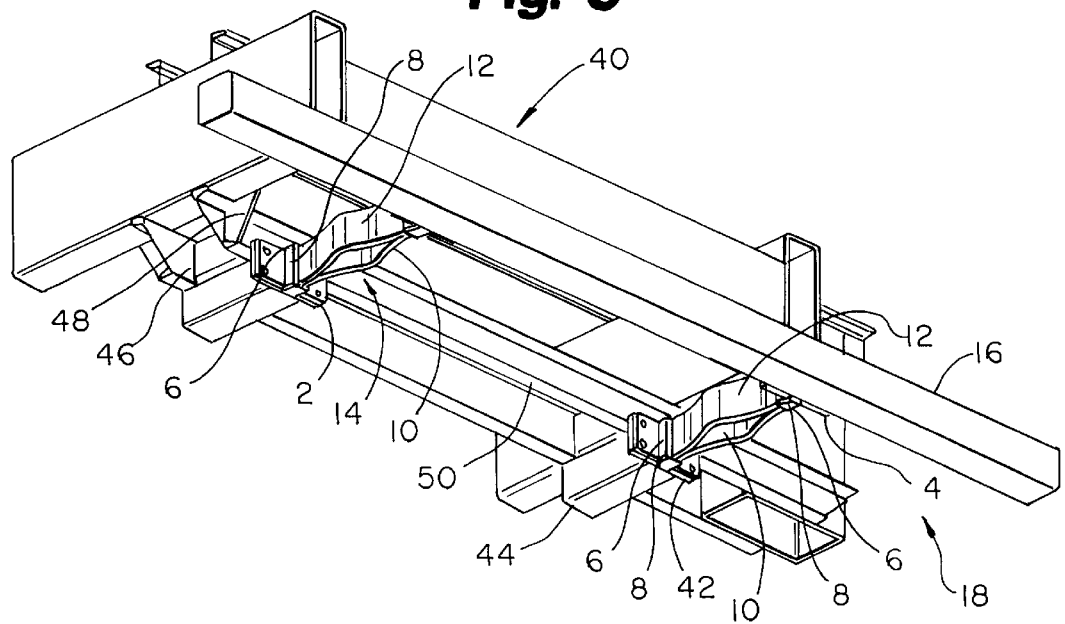
FIG. 3 is a perspective view of the impact barrier guard and crushable absorption link coupled to the undercarriage of a vehicle.

Referring now to FIGS. 1–3, the crushable absorption link 14 of the present invention is further comprised of undercarriage mounting plate 2, impact guard mounting plate 4, side tabs 8, and left and right absorber arms 10 and 12, respectively. Undercarriage mounting plate 2 and impact guard mounting plate 4 are coupled to the ends of left and right absorber arms 10 and 12 by weldments or other suitable connection. Further, undercarriage mounting plate 2 is characterized by four apertures 3 of substantially equal diameter positioned slightly inward from each of the four corners of plate 2.

Side tabs 8 are welded, or connected by other suitable means, to undercarriage mounting plate 2 and impact guard mounting plate 4 so as to encase a distal end portion 11 and a proximal end portion 9 of left and right absorber arms 10 and 12. Side tabs 8 are further welded on left and right sides of left and right absorber arms 10 and 12, and are welded or otherwise connected to one another at all interfaces. Side tabs 8 are welded into a box-like structure 6 to receive end portions 9, 11 of arms 10 and 12.

Commencing at undercarriage mounting plate 2, left absorber arm 10 and right absorber arm 12 abut each other on one side for a predetermined distance at span 20, 22. Moving away from undercarriage mounting plate 2 and beyond the interface at span 20, 22, left and right absorber arms 10 and 12 assume a convex relation to one another for a predetermined span 24, 26 before abutting again along one edge at span 28, 30 upon approaching and at the interface with impact guard mounting plate 4 at distal end 11. The outwardly directed side 33 of each of left absorber arm 10 and right absorber arm 12 presents a convex shape, an aperture 35 being defined between the left absorber arm 10 and right absorber arm 12.

Figure 4:
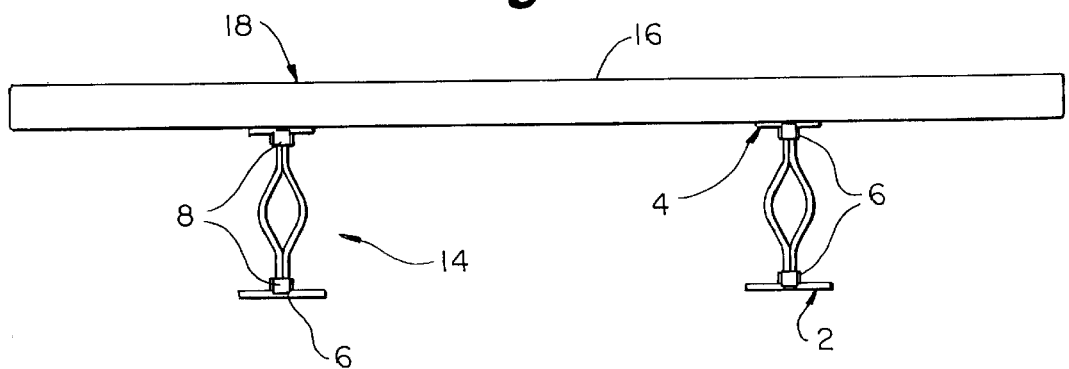
FIG. 4 is a bottom plan view of the rear-impact underride protector.

Referring now to FIG. 4, side tabs 8 are arranged in a substantially rectangular or box-like configuration around left and right absorber arms 10 and 12 to form mounting box 6. Impact barrier guard 16 and crushable absorption link 14 comprise rear-impact underride protector 18, and are coupled by weldments or other means at impact guard mounting plate 4.

Figure 5:
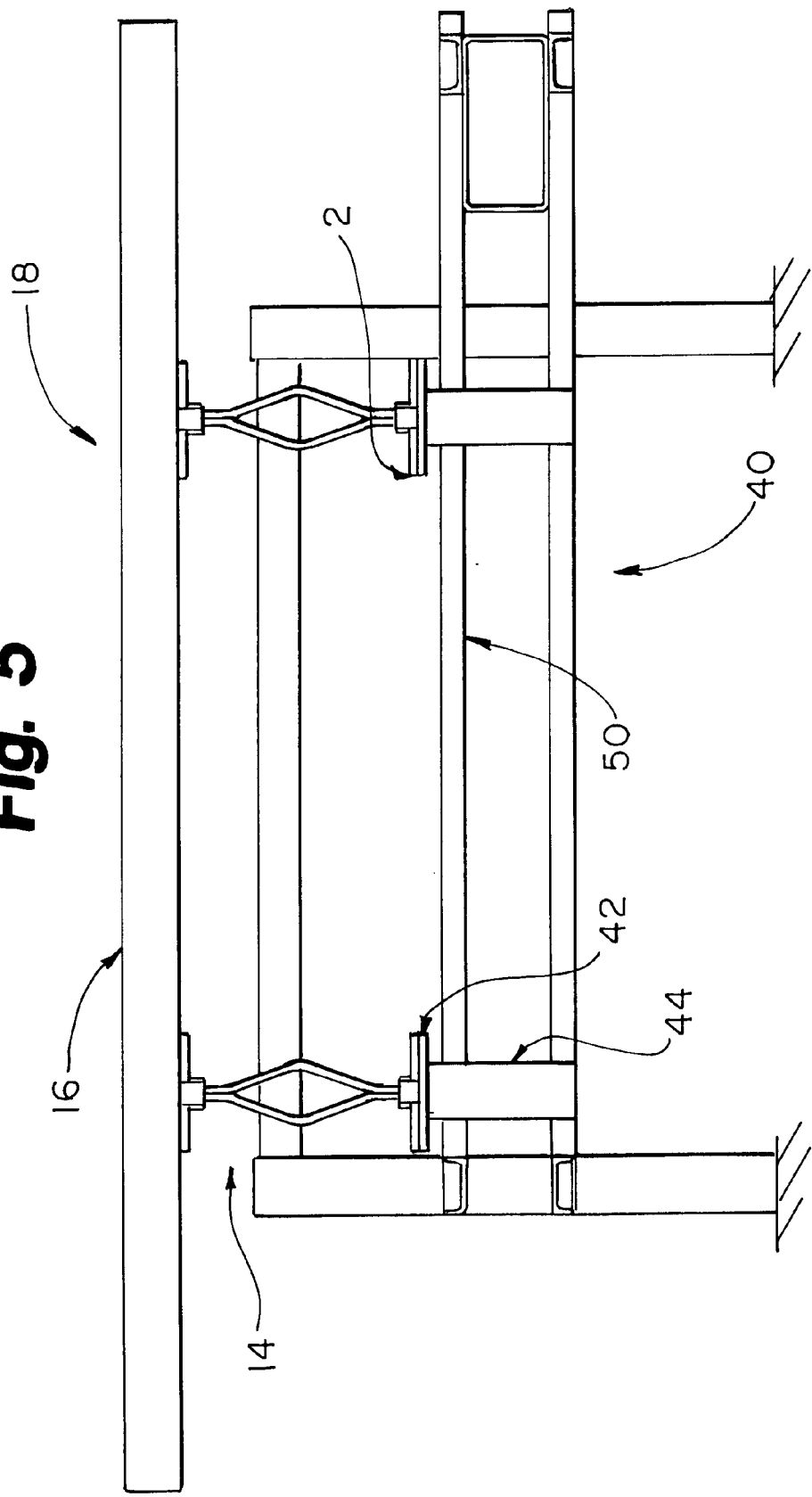
FIG. 5 is a bottom plan view of the impact barrier guard and crushable absorption link coupled to the undercarriage of the vehicle.
Figure 6:
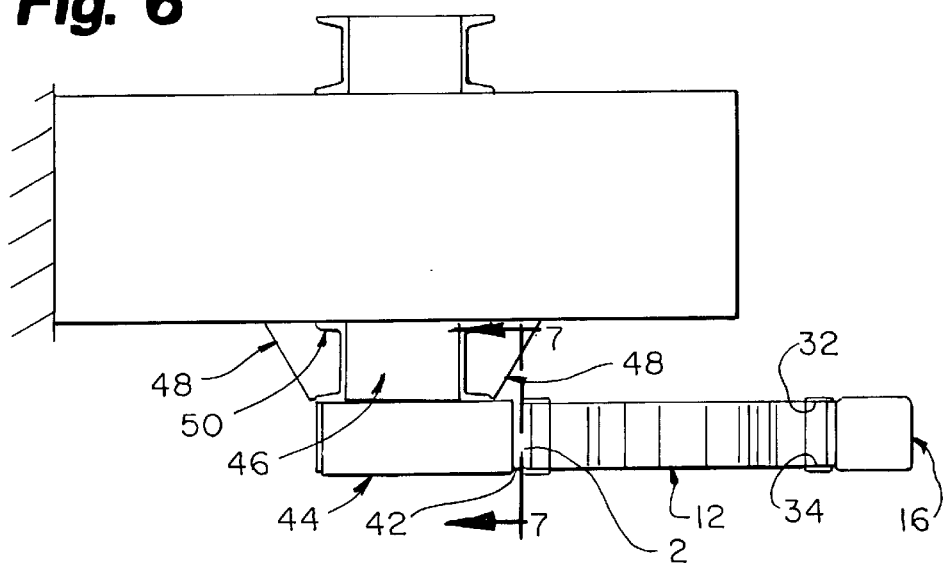
FIG. 6 is a side elevational view of a preferred embodiment of the mounting of the rear-impact underride protector to the vehicle undercarriage.
Figure 7:
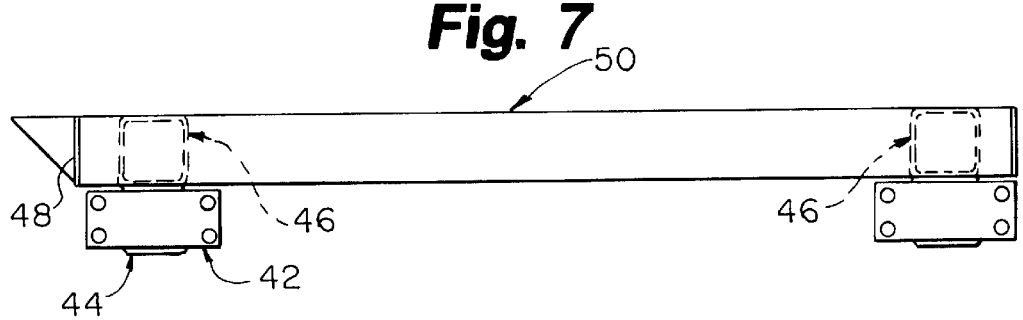
FIG. 7 is a cross-sectional view, taken along line X—X of FIG. 6, of the mounting means coupled to the undercarriage of the vehicle.

Referring now to FIGS. 5–7, rear-impact underride protector 18 is mounted to vehicle undercarriage 40 at undercarriage mounting plate 2. In a preferred embodiment, rear-impact underride protector 18 is coupled to vehicle undercarriage 40 by bolting undercarriage mounting plate 2 to gusset mounting plate 42. Gusset mounting plate 42 is welded or otherwise coupled to bottom undercarriage gusset 44 which, in turn, is similarly connected to top undercarriage gusset 46. Gusset mounting plate 42, like undercarriage mounting plate 2, is characterized by four apertures of substantially equal diameter positioned slightly inward from the four corners of plate 42. In a preferred embodiment, top undercarriage gusset 46 is welded to I-beam 50. I-beam 50 traverses the underside of vehicle undercarriage 40 to provide rigidity for load bearing and is further connected to undercarriage support plate 48.

In operation, rear-impact underride protector 18 serves to absorb and dissipate energy generated by the collision of a car or other vehicle with impact barrier guard 16. Upon the incidence of force against impact barrier guard 16, crushable absorption link 14 compresses to a degree commensurate with the force applied. The diamond- or teardrop-shaped configuration formed by left and right absorber arms 10 and 12 flattens as the ends 9, 11 of arms 10 and 12 are pressed together during deformation.

Given the design of rear-impact underride protector 18, energy from a collision with impact barrier guard 16 is absorbed substantially in a horizontal manner, with any vertical energy absorption being minimal. Such energy absorption is crucial for vehicles having a low profile or otherwise having clearance lower than a standard trailer or semi-trailer, as there is insufficient space for vertical and inclined members to properly absorb energy in a substantially vertical manner. This characteristic of the invention provides a significant improvement over the present state of the art.

Figure 8:
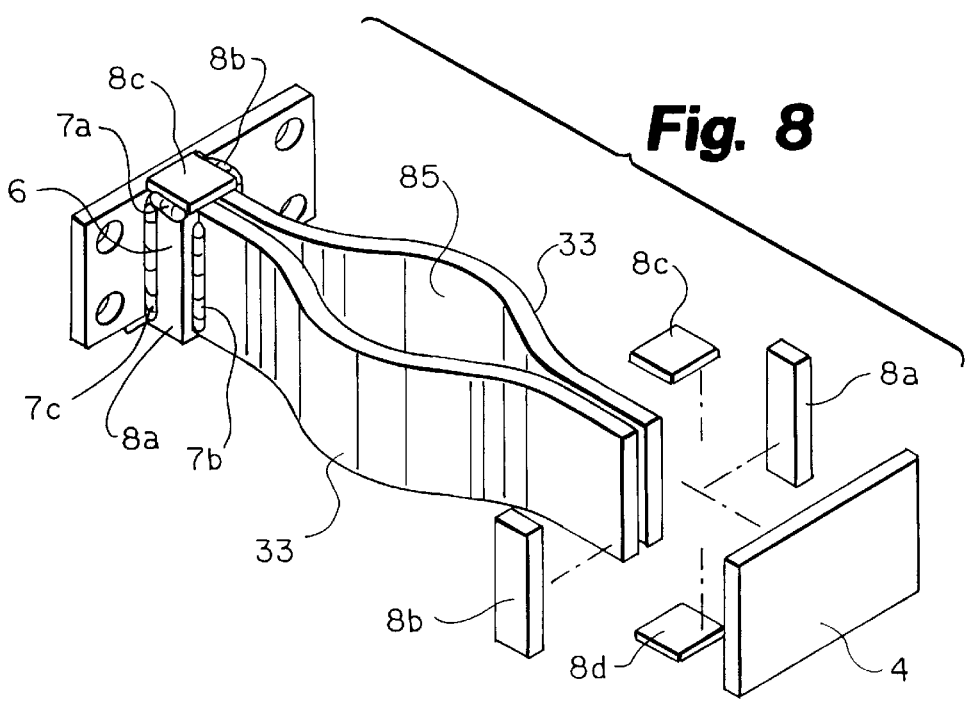
FIG. 8 is a perspective view of a representative crushable absorption link with the proximal end joined to the box and the distal end exploded.

Referring to FIG. 8, tabs 8 are welded together to form mounting box 6 and are positioned at the proximal and distal ends 9, 11 of left and right absorber arms 10 and 12. There are two opposed side tabs, 8a and 8b, and opposed top and bottom tabs, 8c and 8d. The mounting box 6 is formed by preferably disposing the top and bottom tabs, 8c and 8d to partially overly the mounting plate 2 and the end of the side tabs 8a and 8b. A fillet weld 7a is formed along the juncture of the top tab 8c (or the bottom tab 8d), the mounting plate 2, and the end of the side tabs 8a and 8b. The left and right absorber arms 10 and 12 are then welded at fillet weld 7b to the box 6 along the juncture of each of the two opposed side tabs, 8a and 8b, and the outwardly directed, convex side 33 of the left and right absorber arms 10 and 12. The welds 7a, 7b act to join the left and right absorber arms 10 and 12 to the undercarriage mounting plate 2. A further weld 7c is formed at the juncture of the side tabs 8a and 8b with the mounting plate 2 and the impact guard mounting plate 4, respectively. Similar fillet welds 7a, 7b, and 7c (not shown) are formed at the distal end of the left and right absorber arms 10 and 12 to form the distal end box 6 from the tabs 8 and to join the left and right absorber arms 10 and 12 to the impact guard mounting plate 4.

In a rear collision, mounting box 6 prevents the fillet welds 7a, 7b and 7c proximate the undercarriage mounting plate 2 and impact guard mounting plate 4 with proximal and distal ends 9, 11 of left and right absorber arms 10 and 12 from absorbing all of the energy force caused by the impact. Further, the weld between left and right absorber arms 10 and 12 and side tabs 8 on the respective left and right sides provide further strength to crushable absorption link 14 (refer to FIG. 2, wherein top side tabs 8c are removed for clarity). Importantly, there is no weld on the respective top and bottom sides 32, 34 of left or right absorber arms 10 and 12 with side tabs 8. Nor is there a weld between left absorber arm 10 and right absorber arm 12 along the length of the interface of the two arms 10,12 at spans 20, 22 and 28, 30. The absence of welds at these positions is important in that they prevent initiation or propagation of a fracture or stress riser at a weak point in the design.

The radii that form the convex bend in left and right absorber arms 10 and 12 are spaced appropriate distances from the aforementioned welds 7b to ensure that stress is not concentrated on the welds 7b, but rather on the left and right absorber arms 10 and 12 during a rear impact. Further, the radii of concave spans 24, 26 are purposely designed to be gradual so as to avoid a sharp bend in crushable absorption link 14, thereby providing further strength to rear-impact underride protector 18. Additionally, left and right absorber arms 10 and 12 are preferably constructed of a high tensile strength steel or like material. The inside and outside radii 36, 38, which define the shape of left and right absorber arms 10 and 12, should be substantially equal.

Subsequent to a rear-end collision or other impact in which the rear-impact underride protector 18 is damaged or deformed in any manner, the entire apparatus may be easily replaced, as it is designed for one-time use. Undercarriage mounting plate 2 and gusset mounting plate 42 are bolted together to effect this ease of replacement. Easy removal of rear-impact underride protector 18 may occur subsequent to collision or at any other time when removal is beneficial or necessary. In one embodiment, rear-impact underride protector 18 is coupled to I-beam 50 that traverses the width of vehicle undercarriage 40. Alternatively, rear-impact underride protector 18 can be coupled to any other suitable underdeck structure. As should also be appreciated from the foregoing, the invention provides an effective, sturdy, and detachable rear-impact guard which absorbs energy substantially through a horizontal component. Thus, it is expected that the rear-impact underride protector 18, which provides an alternative design for trailers and semi-trailers having a low-profile or otherwise low clearance, will be a significant advancement in the field.

While the invention has been illustrated and described in detail in the drawings and preceding description, the same is to be considered as merely illustrative and not limiting. Only preferred embodiments have been shown and described; and all changes, modifications, or alterations that come within the spirit of the invention are desired to be protected.

What is claimed:

1. A deformable link for an underride protector for a vehicle undercarriage, the link comprising:
   a first absorption arm having a proximal end and a distal end, the proximal end being operably coupled to the vehicle undercarriage, the arm having a plurality of bends defined between the proximal end and the distal end and having an outwardly directed side surface; and
   a second absorption arm having a proximal end and a distal end, the proximal end being operably coupled to the vehicle undercarriage, the arm having a plurality of bends defined tbetween the proximal end and the distal end and presenting an outwardly directed side surface, the second absorption arm being disposed adjacent to the first absorption arm;
   the outwardly directed side surface of the first absorption arm and the outwardly directed side surface of the second absorption arm being convex.

2. The link of claim 1 further including a first mounting box substantially enclosing the proximal ends of the first absorption arm and the second absorption arm and a second mounting box substantially enclosing the distal ends of the first absorption arm and the second absorption arm, the proximal end mounting box being fixedly coupled to a first mounting plate and the distal end mounting box being fixedly coupled to a second mounting plate.

3. The link of claim 2 further including at least one weldment fixedly coupling the first absorption arm to the proximal end mounting box and at least one weldment fixedly coupling the second absorption arm to the proximal end mounting box, there being no weldment coupling the first absorption arm and the second absorption arm.

4. The link of claim 2 further including at least one weldment fixedly coupling the first absorption arm to the distal end mounting box and at least one weldment fixedly coupling the distal end of the absorption arm to the second mounting box.

5. The link of claim 2 wherein the proximal end mounting box includes two side bars, a fillet weld being formed at a first side bar side juncture with the first absorption arm and a fillet weld being formed at a second side bar side juncture with the second absorption arm.

6. The link of claim 2 wherein the distal end mounting box includes two side bars, a fillet weld being formed at a first side bar side juncture with the first absorption arm and a fillet weld being formed at a second side bar side juncture with the second absorption arm.

7. The link of claim 1, wherein said link is readily detachably coupled to the vehicle undercarriage.

8. A mountable underride protector for a vehicle undercarriage and for the absorption of energy in a rear impact incident, the mountable underride protector comprising:
   at least a pair of deformable links, each of said links having, the first and second absorption arms each having a span defining a bend; and
   a horizontal barrier member operably coupled to said links.

9. The underride protector of claim 8 wherein the first and second absorption arms are disposed adjacent one another.

10. The underride protector of claim 9 wherein the bends of the first and second absorption arms are oppositely directed to define an aperture between the first and second absorption arms.

11. The underride protector of claim 10 wherein the bends of the first and second absorption arms are of substantially equal radii.

12. The underride protector of claim 9 wherein the first and second absorption arms are not fixedly joined along an intersection defined between the first and second absorption arms.

13. The underride protector of claim 9 wherein the mounting means of the first and second absorption arms being a rigid mounting box, the mounting box being designed to absorb a portion of the energy borne by the underride protector in a collision.

14. A deformable underride protector, wherein said underride protector is connected to a rear portion undercarriage of a vehicle, depending from the underdeck of said vehicle, the deformable underride protector comprising:
   at least one deformable link having a proximal end and a distal end and having mounting means, the mounting means being disposed proximate the proximal end of the compressible link and being readily detachably couplable to the vehicle undercarriage, the at least one deformable link having a first absorption arm having a proximal end and a distal end, the proximal end being operably coupled to the vehicle undercarriage, the arm having a plurality of bends defined between the proximal end and the distal end and having an outwardly directed side surface and having a second absorption arm having a proximal end and a distal end, the proximal end being operably coupled to the vehicle undercarriage, the arm having a plurality of bends defined between the proximal end and the distal end and having an outwardly directed side surface, the second absorption arm being disposed adjacent to the first absorption, the outwardly directed side surface of the first absorption link and the outwardly directed side surface of the second absorption arm being convex; and
   a substantially transverse barrier member fixedly operably coupled to the distal end of the at least one compressible link.

15. The link of claim 14 further including a first mounting box substantially enclosing the proximal ends of the first absorption arm and the second absorption arm and a second mounting box substantially enclosing the distal ends of the first absorption arm and the second absorption arm, the proximal end mounting box being fixedly coupled to a first mounting plate and the distal end mounting box being fixedly coupled to a second mounting plate.

16. The link of claim 15 further including at least one weldment fixedly coupling the first absorption arm to the proximal end mounting box and at least one weldment fixedly coupling the second absorption arm to the proximal end mounting box, there being no weldment coupling the first absorption arm and the second absorption arm.

17. The link of claim 15 further including at least one weldment fixedly coupling the first absorption arm to the distal end mounting box and at least one weldment fixedly coupling the distal end of the absorption arm to the second mounting box.

18. The link of claim 15 wherein the proximal end mounting box includes two side bars, a fillet weld being formed at a first side bar side juncture with the first absorption arm and a fillet weld being formed at a second side bar side juncture with the second absorption arm.

19. The link of claim 15 wherein the distal end mounting box includes two side bars, a fillet weld being formed at a first side bar side juncture with the first absorption arm and a fillet weld being formed at a second side bar side juncture with the second absorption arm.

* * * * *

UNITED STATES PATENT AND TRADEMARK OFFICE
CERTIFICATE OF CORRECTION

PATENT NO : 6,068,329
DATED : May 30, 2000
INVENTOR(S) : Miller

It is certified that error appears in the above-identified patent and that said Letters Patent are hereby corrected as shown below:

Column 5, line 44, delete "tbetween" and insert --between--.

Column 6, line 62, after "absorption" insert --arm--.

Signed and Sealed this

Seventeenth Day of April, 2001

Attest:

NICHOLAS P. GODICI

Attesting Officer

Acting Director of the United States Patent and Trademark Office